UNITED STATES PATENT OFFICE 2,396,511

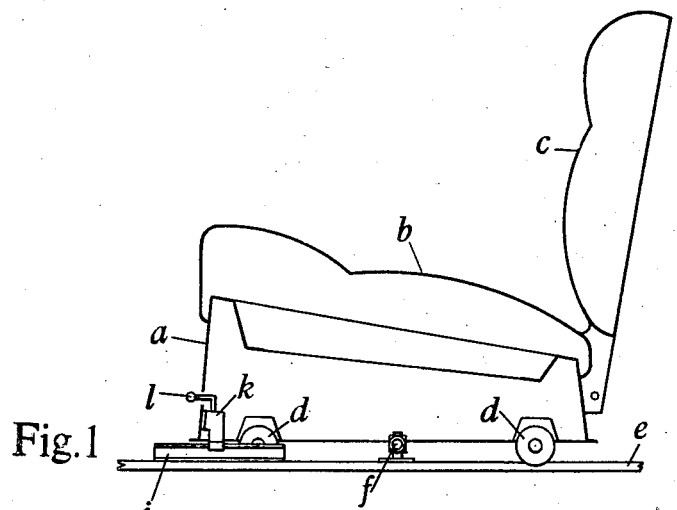
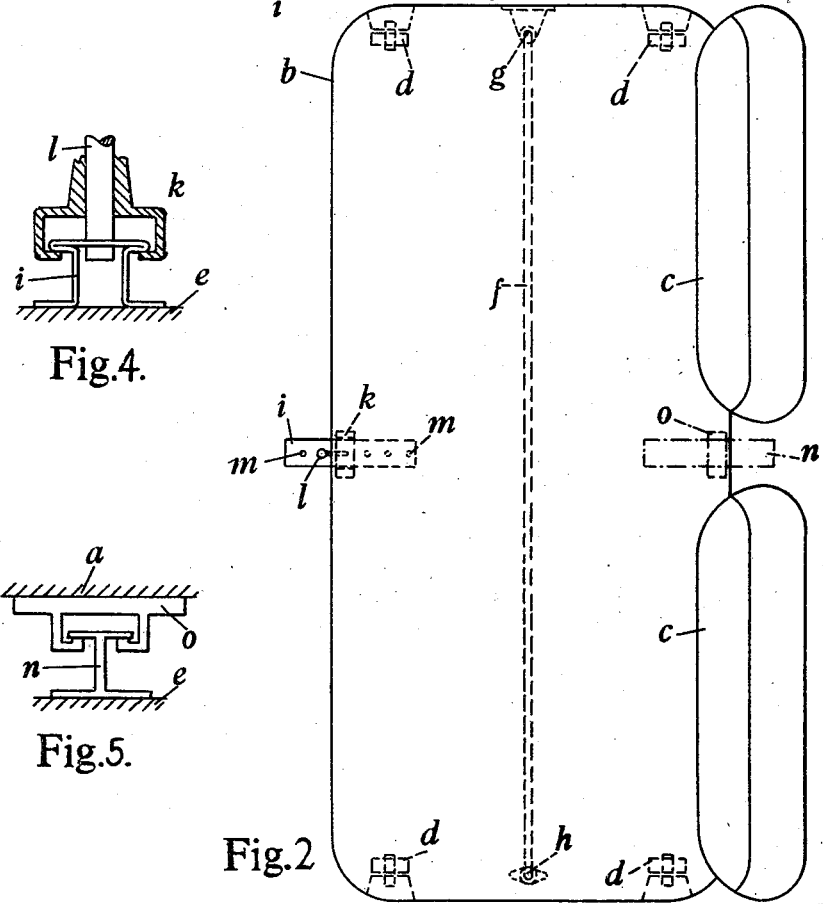
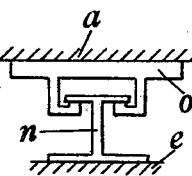
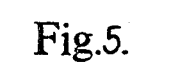

VEHICLE SEAT MOUNTING

Alexander Arnold Issigonis, Oxford, England, assignor to Morris Motors Limited, Cowley, Oxford, England Application January 7, 1944, Serial No. 517,399
In Great Britain January 18, 1943

2 Claims. (Cl. 155—14)

This invention has for its object to provide improved means for adjustably mounting a seat on the floor of a vehicle.

In the accompanying sheets of explanatory drawings:

Figure 1 is a cross section, Figure 2 a plan, and Figure 3 a front view, illustrating diagrammatically one mode of carrying the invention into effect.

Figure 4 is a cross section to a larger scale than Figures 1 to 3 illustrating the securing and restraining means employed at the front edge of the seat.

Figure 5 is a similar view to Figure 4 illustrating an optional restraining means which may be employed at the rear edge of the seat.

Figure 3:
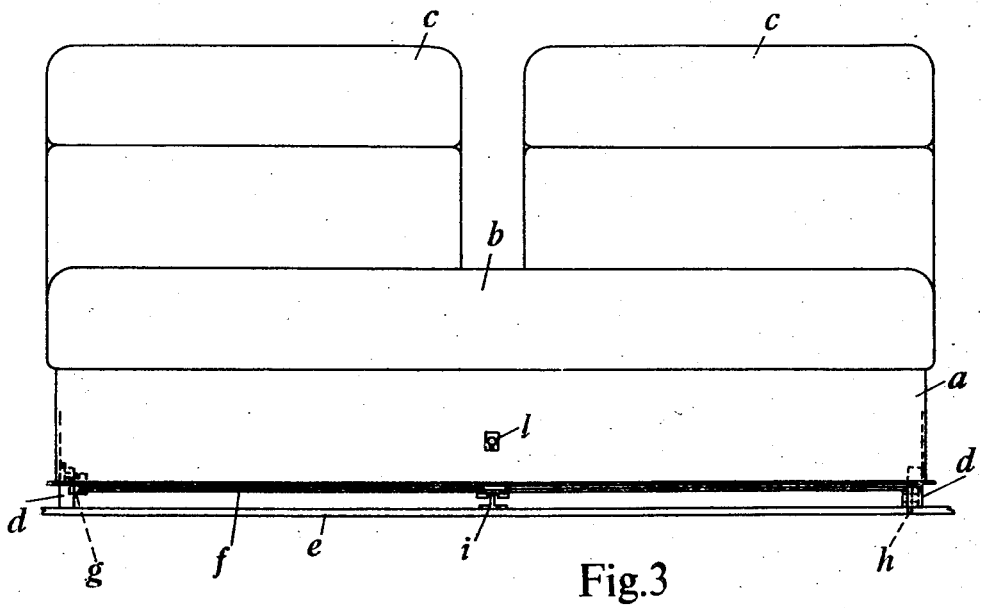

Referring to the drawings, the seat frame is indicated by $a$, and on this is mounted the seat cushion $b$ and back squab or squabs $c$, the seat being long enough to accommodate two or more persons. At the under-sides of the ends of the seat frame are provided rollers $d$ for supporting the seat directly on the floor $e$ of the vehicle. Whilst I prefer to mount the seat on rollers, I may instead employ skids or studs having smooth and rounded under-surfaces.

To effect the required adjustable mounting of the seat on the floor, I employ a radius rod $f$ of approximately the same length as the seat, the rod being situated at or near the longitudinal centre of the seat as shown. One end of the rod is provided with a pivot $g$ whereby it can be attached to the seat frame, and the other end is provided with a pivot $h$ whereby it can be attached to the floor. I also employ a rail $i$ adapted to be secured to the floor at about the centre of and at right angles to the front edge of the seat, and to engage with this rail is arranged a bracket $k$ which is secured to the seat, the rail and bracket serving as restraining means. The rail $i$ has a flanged upper surface and the bracket is adapted to engage the underside of this surface to prevent the seat from being lifted or tilted. In combination with the bracket is provided a hand operable bolt $l$, and the upper side of the rail is formed with a row of holes $m$ any one of which can be engaged by the bolt for securing the seat in the desired position.

To prevent lifting of the rear edge of the seat I may combine with it also restraining means as illustrated at Figure 4 and arranged as indicated by dotted lines in Figure 2. Such means comprise a rail $n$ adapted to be secured to the floor, and a bracket $o$ adapted to be secured to the seat.

The restraining means used at the front (and if desired at the back) of the seat are such as will permit a sufficient amount of relative lateral movement of its parts to enable the seat to move endwise under the constraint of the radius rod when the seat is moved either backwards or forwards. This condition is met in the constructions shown at Figures 4 and 5 by allowing a suitable clearance between the brackets and the longitudinal edges of the rails.

By this invention I am able to provide for the adjustable mounting of a vehicle seat in a very simple and convenient manner. The invention is not, however, limited to the above described example as subordinate constructional details may be varied to suit different requirements.

Having thus described my invention what I claim as new and desire to secure by Letters Patent is:

1. A vehicle seat having at the under-side of its ends means for supporting the seat directly on the floor of a vehicle, and having in combination a radius rod of approximately the same length as the seat arranged longitudinally beneath the seat with its ends situated adjacent to the corresponding ends of the seat, a pivot connecting one end of the rod to the seat, another pivot whereby the other end of the rod is connectible to the floor, and restraining and securing means including interengageable and relatively slidable parts which are arranged in the vicinity of the centre of the front of the seat and are respectively secured to the seat and securable to the floor.

2. A vehicle seat having at the underside of its ends means for supporting the seat directly on the floor of a vehicle, and having in combination a radius rod of approximately the same length as the seat arranged longitudinally beneath the seat with its ends situated adjacent to the corresponding ends of the seat, a pivot connecting one end of the rod to the seat, another pivot whereby the other end of the rod is connectible to the floor, restraining and securing means including interengageable and relatively slidable parts which are arranged in the vicinity of the centre of the front of the seat and are respectively secured to the seat and securable to the floor, and additional restraining means also including relatively slidable parts which are arranged in the vicinity of the centre of the back of the seat and are respectively secured to the seat and securable to the floor.

ALEXANDER ARNOLD ISSIGONIS.